United States Patent [19]

Kaplan et al.

[11] Patent Number: 4,995,300
[45] Date of Patent: Feb. 26, 1991

[54] LATHE FOR GENERATING ASPHERICAL SURFACES ON WORK PIECES

[75] Inventors: Samuel S. Kaplan, Orlando, Fla.; Donald S. Dill, Lancaster, Ohio

[73] Assignee: Chariot Star, Inc., Orlando, Fla.

[21] Appl. No.: 345,418

[22] Filed: Apr. 28, 1989

[51] Int. Cl.⁵ ............................................. B23B 7/00
[52] U.S. Cl. ........................................... 82/12; 82/19
[58] Field of Search .................... 74/578; 51/124 L; 82/1.11, 19, 11.1, 12

[56] References Cited

U.S. PATENT DOCUMENTS

| | | | |
|---|---|---|---|
| 3,881,378 | 5/1975 | Bettiol | 82/12 |
| 3,977,279 | 8/1976 | Hooker | 51/124 L |
| 3,983,770 | 10/1976 | Skrentner et al. | 82/19 |
| 4,302,992 | 12/1981 | Skrentner et al. | 82/19 |
| 4,553,767 | 11/1985 | Robjent et al. | 74/578 |
| 4,584,915 | 4/1986 | Ichiyanagi et al. | 82/19 |
| 4,679,471 | 7/1987 | Wouchope et al. | 82/12 |
| 4,680,998 | 7/1987 | Council, Jr. | 82/12 |
| 4,852,436 | 8/1989 | Benjamin | 82/12 |

Primary Examiner—Fredrick R. Schmidt
Assistant Examiner—Blynn Shideler
Attorney, Agent, or Firm—Robert E. Stebens

[57] ABSTRACT

A lathe is provided for generating surfaces on work pieces and which includes a spindle for support of a work piece while it is revolved and against which a cutting tool is caused to traverse. A tool supporting turret assembly is provided to hold the cutting tool and effect its movement over a path under control of a cam assembly that includes a roller cam having a cylindrical surface. The turret assembly includes a cam follower having a V-shaped configuration which is caused to bear against the roller cam and to move with respect to the cam roller in a manner to result in forming of a surface on the work piece that is of a predetermined configuration through cooperative relative movement in the orientation of the cam follower with respect to the roller.

5 Claims, 3 Drawing Sheets

LATHE FOR GENERATING ASPHERICAL SURFACES ON WORK PIECES

FIELD OF THE INVENTION

This invention relates in general to a lathe for generating aspherical surfaces on work pieces and in particular generating such surfaces of revolution on a front surface of an optical lens blank.

BACKGROUND OF THE INVENTION

Optical lenses designed for correcting vision deficiencies of persons have been developed and utilized for a long period of time. As is the case with any optical lens, it is necessary to generate surfaces, both front and rear, of predetermined configuration to effect a desired correction of a particular patient's vision deficiency. It is a common practice to utilize an apparatus which is of a machine lathe type structure wherein the lens blank is mounted on a spindle which is revolved while a cutting tool is applied to the surface for generating of a specific configuration. An example of such a prior art lathe is disclosed in U.S. Pat. No. 3,977,279 issued Aug. 31, 1976 to Derrell C. Hooker. The lathe disclosed in that patent, in general, comprises a spindle for supporting the lens blank and rotation thereof during surface forming operations and a cutting tool carried on a turret device that is rotatable about an axis transverse to the axis of rotation of the lens supporting spindle. Control mechanism is provided to effect relative displacement of the cutting tool in a predetermined manner during the surface generating operation. This control mechanism includes a concave cam surface against which a spring-biased tool support and cam follower cooperate in effecting this control over the surface to be generated. The surfaces that can be generated by the Hooker lathe may be of not only an aspherical configuration, but may also be spherical. The particular configuration is dependent upon the settings of the various components of the apparatus and particularly as to the control elements.

SUMMARY OF THE INVENTION

The present invention provides an improved lathe having superior capabilities of generating desired surfaces on work pieces such as contact lens blanks. The improved lathe includes the general basic components of a rotatable spindle for supporting the lens blank, a turret assembly carrying the lens cutting tool and a control cam assembly. The control cam assembly supports a roller cam in a predetermined position with respect to the turret assembly. Mounted on the turret assembly is a cutting tool support that not only carries the cutting tool, but also carries a cam follower. The supports for the cutting tool and cam follower are spring-biased to maintain the follower in engagement with the roller cam as the turret assembly is revolved in effecting a cutting operation. In accordance with this invention, the cam follower has a V-shaped configuration including divergent side walls that extend at a predetermined angle to each other and from an apex that has a small radius curvature. In setting up the lathe, the roller cam is positioned at a predetermined point with respect to the axis of rotation of the turret assembly. The cutting tool and cam follower supports are relatively adjustable and positionable on the turret assembly. They are prepositioned with respect to the axis of rotation of the turret assembly in accordance with the position of the roller cam and are set to develop or generate a predetermined surface on the lens blank.

The improved structure of the cam and cam follower in the lathe of this invention are capable of effecting a precise surface configuration which, in the case of a contact lens, is of an optic design that is necessary to effect the appropriate correction for a particular patient. Additionally, the improved cam and cam follower mechanism are capable of controlling the generation of the surface to a desired shape without discontinuities throughout the extent of the optically effective portion and thereby avoid any discontinuities in the area or region of the lens that effects the optical correction.

These and other objects and advantages of this invention will be readily apparent from the following detailed description of the embodiment thereof and the accompanying drawings.

BRIEF DESCRIPTION OF THE DRAWINGS

FIG. 3 is a fragmentary sectional view taken along line 3—3 of FIG. 1.

DESCRIPTION OF THE ILLUSTRATIVE EMBODIMENT

Figure 1:
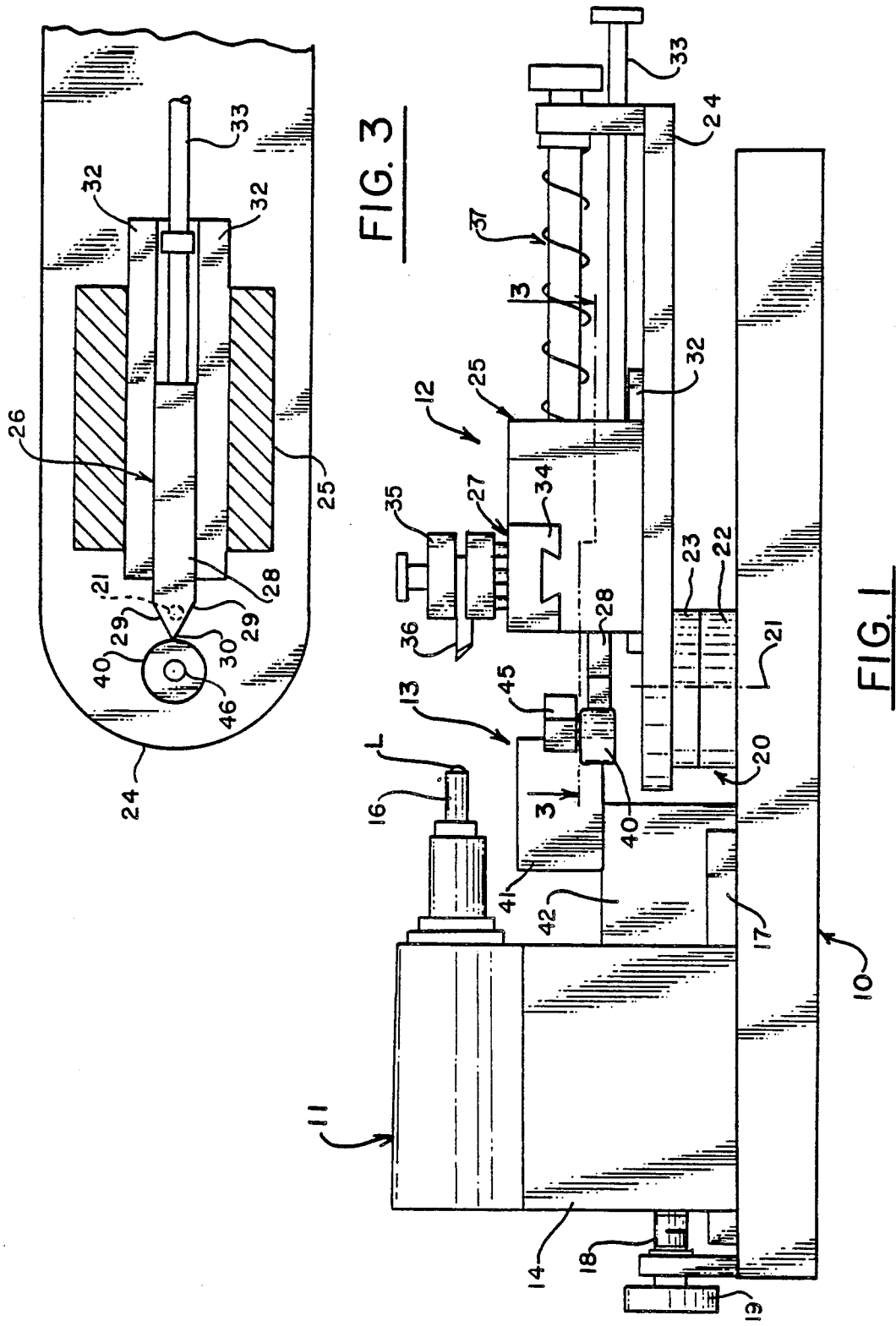
FIG. 1 is a side elevational view of a lathe embodying this invention.
Figure 2:
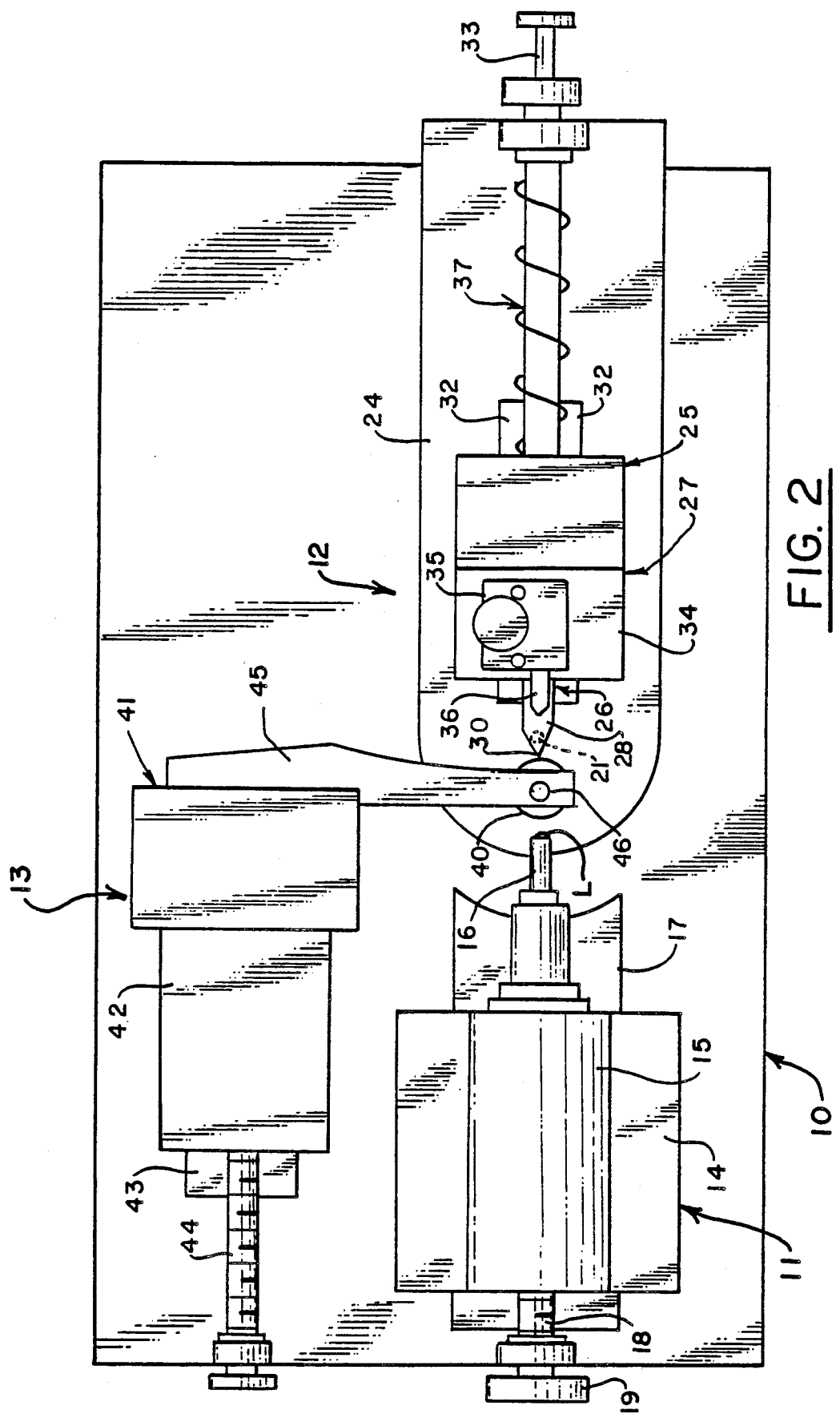
FIG. 2 is a top plan view of the lathe.

Having reference in particular to FIGS. 1 and 2 of the drawings, the lathe apparatus is seen to include as the basic component a base 10, spindle assembly 11, turret assembly 12 and control cam assembly 13. Each of the spindle, turret and control cam assemblies 11, 12 and 13 are mounted on the base 10.

The spindle assembly 11 includes a mounting frame 14 carrying at its upper side a spindle support drive 15 that has an elongated spindle 16 adapted to carry a work piece such as a lens blank L at its free end. As is conventional in a lathe of this type, the spindle 16 is supported for rotation about a horizontal axis. Incorporated in the spindle support drive 15 but not specifically illustrated, is a drive mechanism of a type generally utilized in lens cutting apparatus of this nature and may include a gear mechanism capable of obtaining different rotational speeds as between an electrive drive motor and the spindle 16. Such components are well-known to those skilled in this particular art and thus they are not illustrated in further detail. The mounting frame 14 in this lathe apparatus is of a type that permits selective adjustment of its position on the base along an axis that parallels the spindle. This adjusting mechanism includes cooperating guide ways 17 fixed on the top surface of the base 10 and formed in the lower portion of the mounting frame 14. A screw thread adjusting device 18 is provided and manually operable through a hand wheel 19 to effect positioning of the spindle assembly 11 at a desired point.

Displaced from the spindle assembly 11 is the turret assembly 12 and it is positioned along the longitudinal axis of the spindle. This turret assembly 12 includes a rotatable base mount 20 having a vertical pivot axis designated as 21. This rotatable base mount 20 includes a bottom portion 22 which is adapted to be fixed to the upper surface of the base and an upper section that is relatively rotatable with respect to the bottom. Secured to the upper section 23 is an elongated mounting plate 24. Mounted on the plate 24 is a cam follower and cutting tool support assembly 25. This support assembly 25 includes a cam follower mechanism 26 which is disposed next above the mounting plate 24 and a cutting tool holder 27.

The cam follower mechanism 26 comprises a cam follower 28 that includes as its basic component a flat plate having an end portion formed with side walls 29 that converge toward an apex as can be best seen in FIG. 3. These side walls 29 are interconnected by the generally circularly shaped apex 30 having a relatively small radius. Also included in the cam follower mechanism 26 are guide way plates 32 which mechanically interengage with the cam follower and permit its axial reciprocation. A screw thread adjustment mechanism 33 is provided to position the cam follower with respect to the mounting plate and to maintain the follower in the selected position. The cutting tool holder includes an interconnecting mechanism to permit relative adjustment of the holder with respect to the cam follower mechanism. This cutting tool holder also includes a transverse slide support 34 that carries the cutting tool 36 adjustable with respect to the claim. A spring biasing mechanism 37 is provided and mechanically interconnected as between the mounting plate 24 and the cam follower and cutting tool support assembly 25. This biasing mechanism includes a resilient spring device 38 which is operational to urge the cam follower and associated components in a direction that is generally toward the spindle. Operation of the turret assembly essentially consists of rotating the turret assembly about its vertical axis 21. This causes the cutting point of the tool 36 to swing across the forward face of the lens blank L and to thereby cut the desired surface. Manual operation of the turret assembly is facilitated by means of a handle 39. The control cam assembly 13 includes as its primary component a roller cam 40. This roller cam is mounted on a support assembly 41. Included in the support assembly 41 is a frame structure which is of an adjustable type to permit both longitudinal and transverse positioning of the roller cam 40. Forming the adjustable structure is a base member 42 secured to the base 10 through a guide way 43. The base member 42 is adjustable longitudinally of the base and parallel to the spindle 16 through a screw thread adjusting mechanism 44. Secured to the base member 42 is an elongated support arm 45 to which the roller cam 40 is journalled at its one end. The arm itself is slideably secured in a guide way formed in the base member 42 and is transversely adjustable to a desired position with respect to the base member. This adjustment mechanism permits the roller cam 40 to be relatively positioned as to the axis 21 of the turret assembly. This positioning adjustment enables the lathe to be utilized in forming of any particular and desired surface configuration on the lens blank. This adjustment is in cooperation with the positioning of the cam follower 28 and enables the operator to obtain the desired lens curvature. This relative positioning of the axes 21 and that of the roller cam which is designated as 46 can be seen to be relatively adjustable both in a longitudinal direction as well as a transverse direction.

Figure 4:
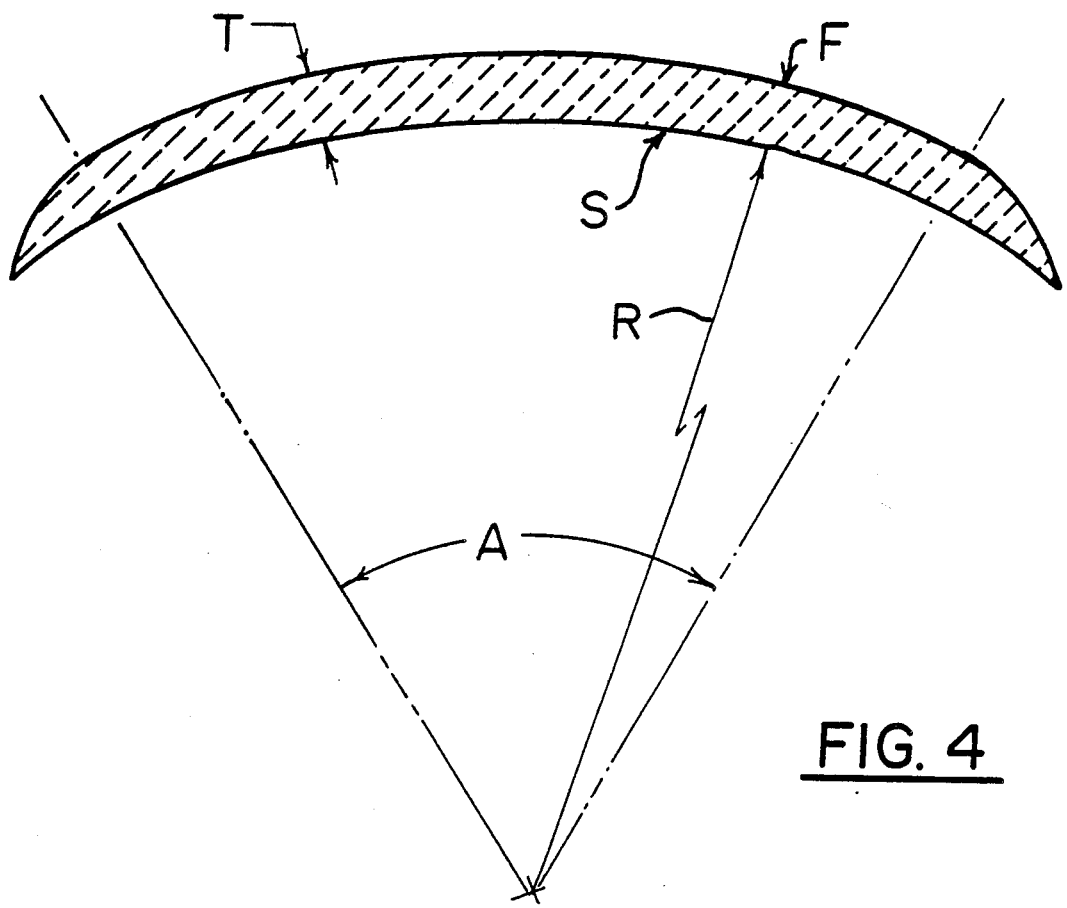
FIG. 4 is a medial cross-sectional view of a contact lens having surfaces generated by the lathe apparatus.
Figure 5:
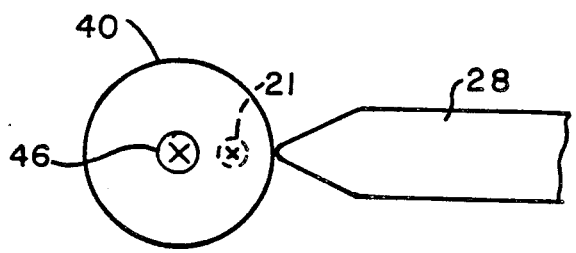
FIGS. 5 and 6 are sequential diagrammatic illustrations of the relative positioning of the cam and cam follower as results from revolution of the turret assembly.
Figure 6:
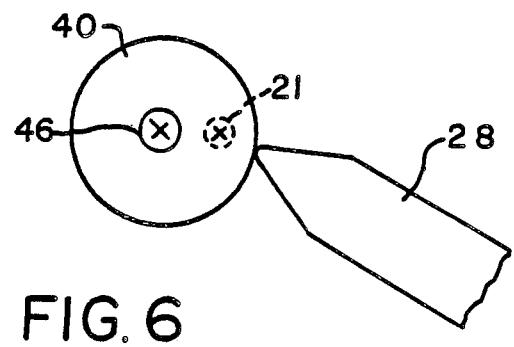

FIGS. 5 and 6 diagrammatically illustrate the functioning of the cam follower 28 with respect to the cam roller 40. In this diagrammatic illustration, it will be noted that the axis 46 of the cam roller is located along the longitudinal axis of the lathe and which longitudinal axis is extending through the vertical axis 21 of the turret assembly, but is spaced with respect to the turret axis 21. The turret assembly is operated to swing the cutting tool 36 along a predetermined path with that path being determined by the cooperative action of the forward end of a cam follower 28 relative to the circular surface of the cam roller 40. This structure comprising primarily the cam follower and roller cam enables the lathe of this invention to perform a unique function in the forming of a lens surface and specifically, the front surface of a lens. A shape that can be developed for a contact lens is diagrammatically illustrated in FIG. 4. In that illustration which is a medial sectional view of a formed lens, the lens is seen to have a rear spherical surface designated by the letter S having a radius R and a front surface designated by the letter F. A lens configuration that can be developed by the lathe of this invention is a front surface F having a configuration which throughout the extent of effective optical operating range, which range is generally indicated by an arc A, results in a lens that has a constant thickness T throughout the extent and its operating range. Variations in the thickness T result in different optical characteristics as determined in accordance with the particular patient's requirements.

Having described an illustrative embodiment of this invention, what is claimed is:

1. A lathe for generating surfaces of revolution on a work piece comprising
   a base;
   a spindle assembly mounted on said base and including an elongated, rotatably supported spindle having a longitudinal axis and an end for mounting of a work piece thereon and means for rotating said spindle, said spindle axis being disposed in a predetermined plane;
   a turret assembly mounted on said base and including a rotatable base mount for pivotally supporting said turret assembly about a vertical axis of rotation disposed transversely to said spindle axis, a cam follower and cutting tool support assembly secured to said base mount for relative displacement along an axis of displacement in a plane disposed in transverse relationship to said vertical axis of rotation of said turret assembly, a cam follower having an end portion of V-shaped configuration having an apex and side walls divergent from said apex, a cutting tool and resilient biasing means for urging said cam follower and cutting tool support assembly in a predetermined direction along said axis of displacement, and
   a control cam assembly mounted on said base and including a roller cam carried by a support assembly for supporting and positioning said roller cam for free rotation about an axis of rotation parallel to the axis of rotation of said turret assembly, said roller cam having a cylindrically shaped surface against which said cam follower bears.

2. A lathe according to claim 1 wherein said cam follower apex is of arcuate configuration.

3. A lathe according to claim 1 wherein said cam follower apex is of circular configuration.

4. A lathe according to claim 1 wherein said cam follower side walls are of planar configuration.

5. A lathe according to claim 4 wherein said cam follower apex is of arcuate configuration and said side walls are in tangent relationship thereto.

* * * * *